United States Patent Office 3,269,941
Patented August 30, 1966

3,269,941
METHOD OF NEUTRALIZING ACID
BLEACHERY EFFLUENT
Archie R. Le Compte and John W. Davis, Neenah, Wis.,
assignors to Kimberly-Clark Corporation, Neenah, Wis.,
a corporation of Delaware
Filed Mar. 23, 1964, Ser. No. 353,954
1 Claim. (Cl. 210—59)

This present invention relates to the treatment of acidic bleachery effluent for the purpose of ultimately effecting disposal of the effluent. Additionally, the invention is concerned with the utilization of the lime mud of a kraft pulping system in the treatment of acidic bleachery effluent.

A primary object of the invention is to provide a simplified and improved method of neutralizing acidic bleachery effluent whereby such method will produce significant economy and be readily adaptable to a wide range of acidic bleachery effluents.

A further object of the invention is to provide a simple low cost system for neutralizing and disposing of acidic bleachery effluent.

Another object of the invention is to provide an improved method for neutralizing acidic bleachery effluent which avoids formation of a stable foam, a problem common in connection with neutralizing systems containing organic acids.

An additional object of the invention is to provide an improved system for neutralizing acidic bleachery effluent which employs the lime mud of the kraft pulping system for effecting neutralization of the effluent to a substantial degree.

Yet another object of the invention is to provide a new and improved method for neutralizing acidic bleachery effluent, which method eliminates steps and process equipment commonly associated with kraft pulping processes.

Commonly, in the neutralization of acid effluents of papermills and the like, alkalies such as calcium oxide or calcium hydroxide are employed. Also, procedures such as flowing the acid effluent through a bed of alkali such as limestone have been attempted without material success.

We have investigated the utilization of various alkalies for such purposes of acid neutralization. Quite unexpectedly, we have found that calcium carbonate has desirable utility for the purpose if certain conditions noted below are followed.

First, the calcium carbonate must be fluidized in the acid effluent. By fluidized as used in this description and the appended claims, we mean that the individual particles must be essentially completely surrounded by and carried in the acid effluent. Flowing the effluent through a bed of the calcium carbonate is not satisfactory for our purpose.

Second, the calcium carbonate should be as fine as possible and should not exceed 30 microns equivalent diameter. By equivalent diameter we refer to the particle size as determined by sedimentation tests and a diameter which as to suspendability corresponds to that of a perfect sphere of 30 microns diameter. Somewhat more specifically, all particles should be of a size to readily pass a 400 mesh screen. We have found that when $CaCO_3$ particles of larger size are employed, their neutralizing action rate is very slow, their tendency to carry out of the reactor in a fluidized condition is increased, and the reaction zone volume is increased materially and disproportionately. Essentially, the particle size as described is in the range to provide conditions such that the most economical equipment design may be used and the pH control most precise. Further, the particle size is such that the calcium carbonate is essentially completely reacted prior to the discharge of the partially neutralized acid effluent from the reaction zone so that no calcium carbonate loss occurs and particularly so that no solid material is carried out of the reaction zone to the final touch-up neutralizing procedure described hereinafter. If the particles are in the effluent of the reaction chamber, they will not be completely solubilized in the subsequent final neutralization step but will pass to the digestion and effluent system, thus tending to load the said system with undesired solids. Removal of the solids from the effluent of the reaction zone or the effluent system would require difficult operation and expensive equipment such as sedimentation and/or centrifugal apparatus.

Thirdly, we have found that the treatment with the calcium carbonate should be limited so that the pH of the medium after treatment does not exceed about 4.3. Commonly, the acidic effluent has a pH of between about 1.8 and 2.2. Raising the pH of the effluent to values in excess of about 4.3 with calcium results in the development of a very stable foam; this foam is a reaction product which forms from reaction between calcium ions and organic acids in the higher pH ranges. Also, in the higher pH acid ranges a film develops on the surface of the particles. This film or coating is evidently the result of precipitation on the calcium carbonate particles of organic materials such as calcium soaps of organic acids contained in the acid effluent; the films then inhibit acid diffusion into the particles.

Importantly, we have also found that, while commercial calcium carbonate of 30 microns diameter and less may be obtained and used, the kraft pulping process provides an excellent source of the carbonate. Mechanical action on the carbonate to attain the particle size is then avoided with consequent cost savings. Utilizing the carbonate of the kraft system also permits some simplification of the liquor recovery equipment and process of that system. This feature is discussed in connection with the following detailed description and accompanying drawings wherein.

Initially, it is noted that the sequence of steps in which liquor recovery is made are rather generally set forth, but sufficiently so to specifically point out the features in accordance with the invention. As is well known in the art, other supplemental steps of the recovery process such as washing and concentration of the material of the system may be included without affecting the principles of our invention.

Figure 1:
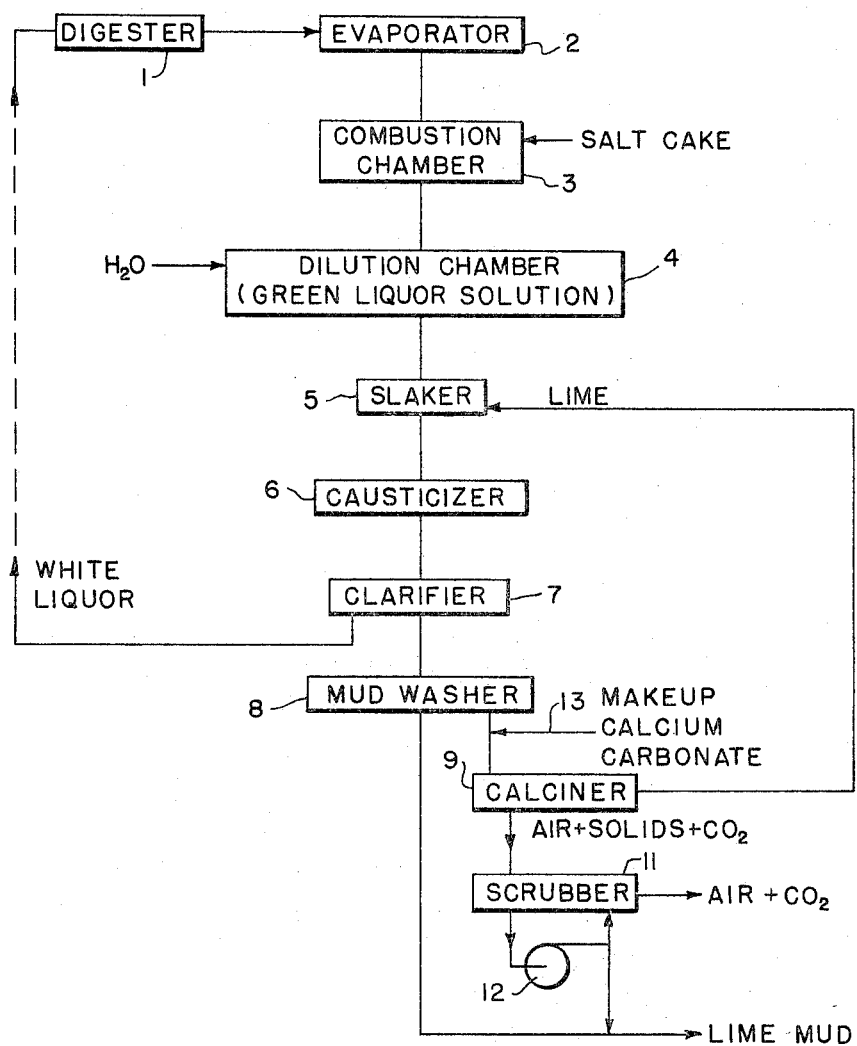
FIG. 1 illustrates by block diagram a sequence of steps in the recovery of white liquor from black liquor of the kraft process in accordance with the invention.

Referring to FIG. 1, the numeral 1 designates the digester in which the pulp is subjected to treatment with white liquor. The resultant black liquor of the pulping process which is to be subjected to the recovery operation flows from the digester to an evaporator 2; a washing step is frequently included between the digester and evaporator. The combustion unit or recovery furnace 3 receives from evaporator 2 the concentrated black liquor which is burned in the combustion unit with saltcake, the lignin of the liquor supplying the fuel. The chemical products of the combustion action flow as a molten ash to a dilution chamber or smelt tank 4; weak wash water addition in this chamber creates a green liquor from the ash; the weak wash water, as is known, may be obtained by recirculation from other steps of the process. Clarification of this green liquor and the removal of dregs from the liquor is commonly necessary before passing the liquor to a slaker designated at 5. In the present instance this clarification step and the usual asociated equipment for removal of dregs is eliminated; such equipment is commonly large, space consuming and subject to relatively short life and, therefore, its elimination is desired.

The slaker 5 receives the unclarified green liquor and the usual lime addition necessary to effect the white liquor making. The numeral 6 denotes a causticization chamber or causticizer in which the liquor is retained for a period of time to consumate the reaction; the numeral 7 denotes a clarifier from which white liquor is commonly recirculated to the digester, and from which lime mud is commonly withdrawn for washing at 8 and for calcining at 9. Calcined material is then usually returned to slaker 5 as indicated.

Figure 2:
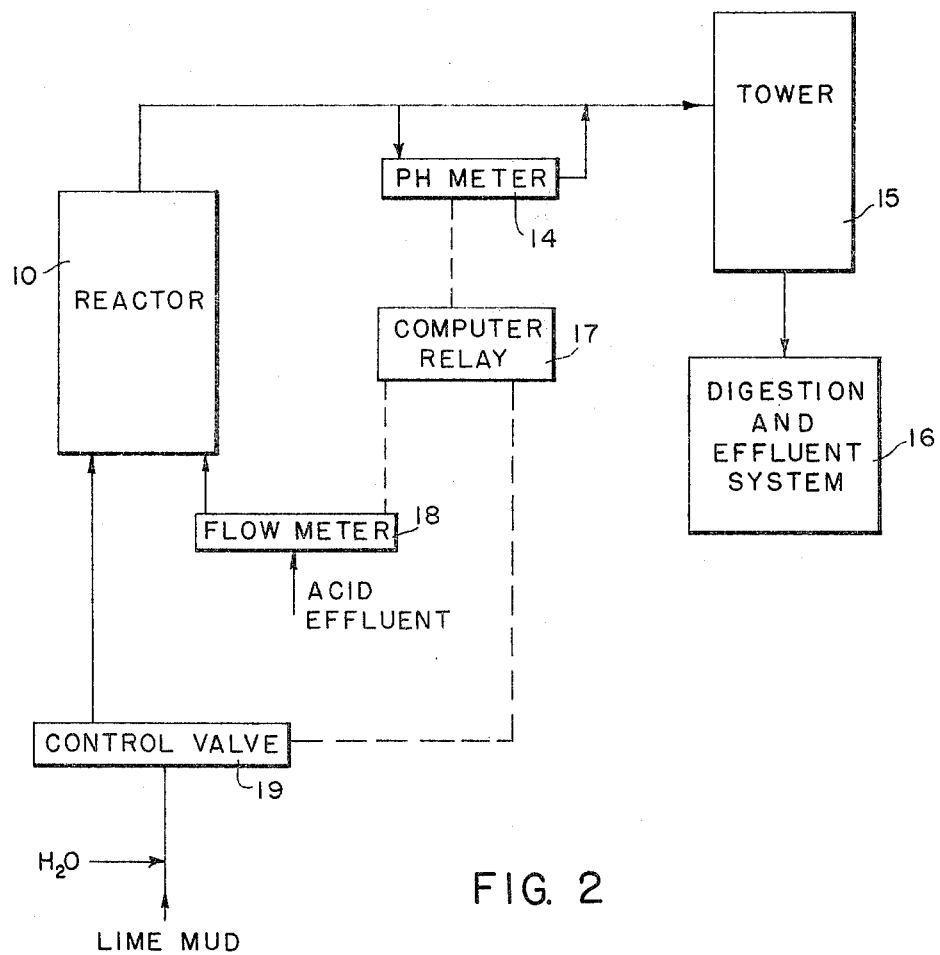
FIG. 2 illustrates the steps in the treatment of the acid effluent utilizing lime mud derived from the procedure of FIG. 1.
Figure 3:
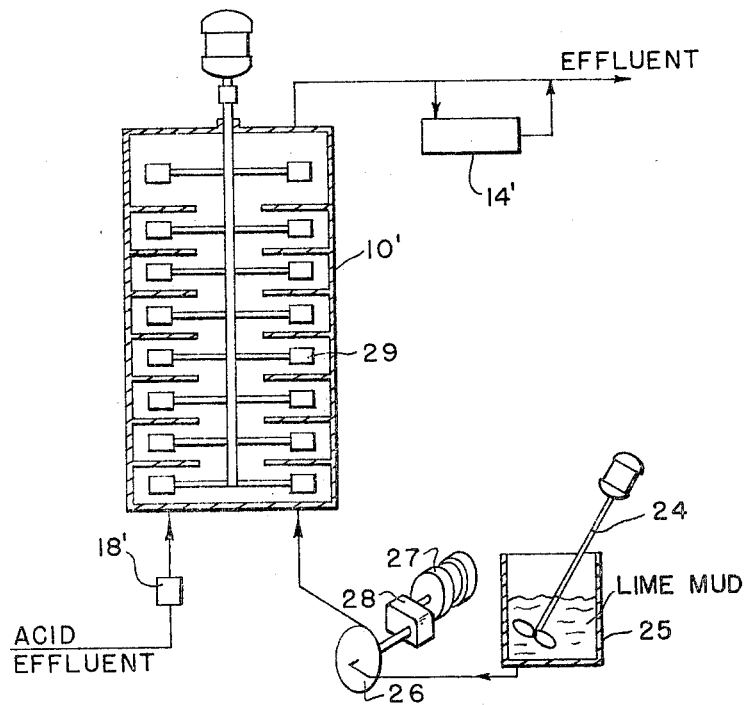
FIG. 3 is a diagrammatic representation of an apparatus arrangement in accordance with the invention.

As shown, a portion of the washed lime mud may be passed directly to the neutralization reactor designated at 10 in FIGS. 2 and 3. Combined with the portion passing directly from the mud washer are calcium carbonate fines which are a product of the calcining operation and which are scrubbed at 11. Scrubbing may be facilitated by some recycling to the scrubber by means of water pump 12; recycling permits handling of the volume of water required.

The lime mud as a whole is of particular suitability as it contains calcium carbonate crystals of very fine particle size as well as a proportion of calcium carbonate in solution. The dissolved portion is very small, about 15 parts per million, and has only a very minor effect on the subsequent neutralization. The pH of such lime mud is commonly between about 11 and 13; the lime mud, in addition to the calcium carbonate, may contain some sodium hydroxide but such is not present in sufficient quantity to play an important role in the subsequent effluent neutralization. The crystals of calcium carbonate are formed in the clarifier 7 by reason of the reaction of sodium carbonate and calcium hydroxide to form calcium carbonate which in turn crystallizes.

For the purposes of maintaining the lime content of the liquor recovery system at suitable concentrations, makeup calcium carbonate is added as a dry feed at 13. Such calcium carbonate, however, need not be of particularly fine particle size and involves no premium cost. Accordingly, the kraft recovery process is, in this instance, employed as a convenient economical source of the fine particles of calcium carbonate for the acid effluent neutralization while improving the kraft recovery process itself.

The lime mud as it flows to the reactor 10 is made fluid for pumping and control purposes by water addition. The acid effluent is highly fluid and contains organic material, frequently acid soaps as well as lignins, celluloses and inorganics such as iron and silicon compounds as well as free chlorine. By the term acid bleachery effluent as employed herein and the appended claim, we mean an effluent of the nature described in this paragraph. The reactor 10 is itself suitably lined in known manner for resistance to these acids.

Mild agitation is supplied to the combination of acid and lime mud in the reactor 10. The small particles of calcium carbonate distribute well throughout the acid and are well fluidized. The reaction time to effect partial neutralization of the acid to about pH 4 is influenced by the lime mud particle size. Diffusion of the acid to the surface of the calcium carbonate particle is promoted by the agitation. We have found that the reaction time, while it may be varied somewhat dependent upon specific conditions, is usually less than about 2 to 3 minutes; accordingly, the design of the reactor should provide for reasonable retention of the lime mud-acid effluent combination to effect the pH rise of the acid from about 4.0 to 4.3. As illustrated in FIG. 2, the provision of a pH meter 14 at the outlet of the reaction chamber 10 aids control of the reaction and facilitates proper proportioning of the lime mud to the incoming acid effluent. The specific character of the lime mud and acid effluent may vary to some degree as to constituency and pH while yet being within the scope of the invention.

From the reaction chamber 10 the flowing partially neutralized (about 90% or more neutralized) acid material is directed to a caustic tower (or a suitable mixing tank, for example) 15 to which alkaline bleachery effluent is supplied. Preferably, all free mineral acid is neutralized in the reaction zone together with some organic acids and touch-up neutralization is effected by this alkali. The alkali normally is in sufficient quantity to raise the pH of the material to at least 6.5 and preferably 7.0. The thus neutralized material is passed to disposal. This disposal may involve a digestion disposal system 16 which is an aerobic system containing bacteria which are effective to destroy the organics in the effluent. Neutralization prevents killing of the bacteria.

Control of flow of acid effluent and lime mud may be effected in a plurality of ways. In FIG. 2 we have broadly illustrated a computer relay 17 which is connected electrically (or pneumatically) to the pH meter 14 and to the flowmeter 18 of the inlet acid effluent conduit. The computer relay is also connected to the control valve 19 of the lime mud inlet conduit. By sensing the outlet pH and the volume of acid flow, the computer relay governs the position of the control valve 19 and supplies the appropriate quantity of lime mud to achieve the desired pH. It will be understood, however, that such controls form no part of the invention and control may be effected in any suitable and convenient manner.

In specific application we have found that a multi-stage reactor as illustrated in FIG. 3 is most desirable for the purpose. A multi-stage reactor provides for progressive neutralization as the effluent flows upwardly through the reactor and minimizes the reactor volume necessary. However, a very long pipeline might be used as the reactor provided that the flow is non-turbulent and preferably on the borderline betwen laminar and turbulent flow so that particles will be slightly agitated and wholly suspended.

Figure 4:
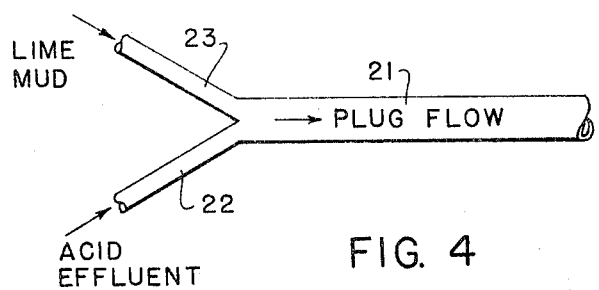
FIG. 4 indicates another method of practicing the invention.

FIG. 4 illustrates a pipeline 21 into which the acid effluent is directed through elbow 22 and lime mud is directed through elbow 23. This flow we have described as "plug" flow and by this we mean that successive sections of the combined lime mud and acid effluent pass along the pipeline in sequence without major turbulence, so that the solid particles are merely well mixed and suspended but not violently agitated; the agitation of laminar flow is sufficient for the purpose.

*Example 1*

Acid bleachery effluent at a pH of 1.88 was directed into the multi-stage reactor 10' (FIG. 3). Conveniently, lime mud from the described recovery process was maintained in suspension by motor driven stirrer 24 in the mud slurry tank 25. Feed of the slurry was by metering pump 26. This pump was driven by motor 27 through reducer 28. The solids content of the mud slurry was 13.7%. To effect neutralization of the acid effluent 645 parts by weight of calcium carbonate per million parts of acid effluent were required. The pH of the acid effluent in was 1.88; the pH of the acid effluent out was 4.05. The temperature in the reaction zone was 34° C. The retention time in the reaction chamber was 0.747 minute and essentially all of the calcium carbonate was consumed in the reaction. The speed of the motor driven agitator 29 was approximately 1680 r.p.m.

Repeated tests under the same conditions but with agitator speeds of from 440 to 1680 r.p.m. indicated that speed of agitation did not have a material bearing on reaction time.

In the measurement of calcium components in the output of the reactor 10', account must, of course, be taken of any calcium component introduced by the effluent itself. The latter quantity we have found frequently varies, and tests in the present instance indicated the quantity to be from about 95 to 110 parts per million of acid effluent. Such calcium components play no part in the reaction and are not included in the quantity consumed noted above.

It is not essential that the pH out of the reaction chamber exceed about 3.0, as further neutralization with sodium alkali is then also readily achieved. Further, it is achieved at a relatively high rate since the reaction is then ionic in character in contrast to the diffusion controlled reaction between the calcium carbonate particles and the acid. In changing the pH from pH 2 to pH 3, 90% of the neutralization is complete.

The neutralizing reaction in chamber 10 is, of course, influenced to some degree by temperature. However, temperature is not a critical factor in this diffusion controlled reaction, and reaction rate increases much more slowly with temperature than in a basically ionic type reaction.

While the use of lime mud has been emphasized as the source of the calcium carbonate, it will be appreciated that calcium carbonate ground to the proper size could be introduced to reactor 10 with the acid effluent. Such procedure is effective and much less costly than lime ($CaO$ or $Ca(OH)_2$) addition for acid neutralization. By the term lime mud as employed in this specification and the appended claims we mean the material produced in the kraft liquor recovery process in the causticizing operation. By the term acid bleachery effluent as employed in this specification and appended claim we include particularly the counter current discharge of all acid stages in a bleachery operation of a paper mill.

It will be understood that this invention is susceptible to modification in order to adapt to different usages and conditions and, accordingly, it is desired to comprehend such modifications within the invention as may fall within the scope of the appended claim.

What we claim is:

In the treatment of acid bleachery effluent to increase the pH of the effluent to an upper limit of 4.3 by reaction of the acid effluent with calcium carbonate, the steps of flowing the acid effluent through a reaction zone from an inlet of the zone toward an outlet of the zone, fluidizing and agitating in the said acid effluent for reaction with the acid effluent in said zone lime mud produced in a kraft pulpmaking liquor recovery process by causticizing unclarified green liquor and clarifying the resultant reaction product to obtain white liquor and the lime mud, said lime mud having a pH in the range of about 11 to 13 and containing finely divided solid particles of calcium carbonate substantially all of which have a maximum equivalent diameter of about thirty microns, and withdrawing the effluent from said zone at a pH in the range of at least 3 to about 4.3, said effluent from said zone being substantially free of solid particles of suspended calcium carbonate.

References Cited by the Examiner

UNITED STATES PATENTS

| | | | |
|---|---|---|---|
| 1,743,080 | 1/1930 | Bradley et al. | 23—48 X |
| 2,552,183 | 5/1951 | Knight | 162—30 X |
| 2,729,545 | 1/1956 | Reman et al. | 23—270.5 |
| 3,194,638 | 7/1965 | Neuville | 23—283 |

OTHER REFERENCES

Gurnham: Principles of Industrial Waste Treatment, 1955, John Wiley, New York, pp. 178, 182–184, 186, 187, 199 and 200.

Hoak et al., I: Treatment of Spent Pickling Liquors with Limestone and Lime, Ind. Eng. Chem., vol. 37, 1945, pp. 553–559.

Hoak et al., II: Pickle Liquor Neutralization, Ind. Eng. Chem., vol. 40, November 1948, pp. 2062–2067.

Jones: Acid Wastes Treatment, Sewage and Ind. Wastes, vol. 22, February 1950, pp. 224–227.

King et al.: First Year's Operation, etc. (Calco), Sewage Works J., vol. 14, May 1942, pp. 666–684.

Rudolfs: Industrial Wastes, 1953, Reinhold Publishing Corp., New York, pp. 236–238, 246–248 and 267–271 and 282.

MORRIS O. WOLK, *Primary Examiner.*

MICHAEL E. ROGERS, *Examiner.*